United States Patent
Brandt

(10) Patent No.: US 11,190,926 B2
(45) Date of Patent: Nov. 30, 2021

(54) RADIO BASED SMART DEVICE IDENTIFICATION TOOL FOR COMMISSIONING

(71) Applicant: Brian Eldin Brandt, Longmont, CO (US)

(72) Inventor: Brian Eldin Brandt, Longmont, CO (US)

(73) Assignee: LEDVANCE LLC, Wilmington, MA (US)

( * ) Notice: Subject to any disclaimer, the term of this patent is extended or adjusted under 35 U.S.C. 154(b) by 0 days.

(21) Appl. No.: 15/866,279

(22) Filed: Jan. 9, 2018

(65) Prior Publication Data

US 2018/0176760 A1 Jun. 21, 2018

Related U.S. Application Data

(60) Provisional application No. 62/419,729, filed on Nov. 9, 2016.

(51) Int. Cl.
*H04W 8/00* (2009.01)
*H04W 76/15* (2018.01)
(Continued)

(52) U.S. Cl.
CPC ............ *H04W 8/005* (2013.01); *H04W 76/11* (2018.02); *H04W 76/14* (2018.02); *H04W 76/15* (2018.02);
(Continued)

(58) Field of Classification Search
None
See application file for complete search history.

(56) References Cited

U.S. PATENT DOCUMENTS 5,177,604 A * 1/1993 Martinez ............... G01S 13/878
348/475
9,192,019 B2 11/2015 Huizenga et al.
(Continued)

OTHER PUBLICATIONS

Turner, Eric, "3D Modeling of Interior Building Environments and Objects From Noisy Sensor Suites", Retrieved from http://www-video.eecs.berkeley.edu/papers/elturner/elturner_phdthesis.pdf, May 14, 2015, p. 148.
(Continued)

*Primary Examiner* — Ajit Patel
*Assistant Examiner* — Liem H. Nguyen
(74) *Attorney, Agent, or Firm* — Neugeboren O'Dowd Tutunjian & Bitetto PC

(57) ABSTRACT

This disclosure describes systems, methods, and apparatus for wireless and non-line-of-sight commissioning of smart devices. Smart devices can broadcast a first radio message that is detected by an ID tool during commissioning. The first radio messages can be unique to each device, such that the ID tool can send a second radio message addressed to a select device, the address based on the first radio message from the select/addressed device. The addressed device can respond to confirm the identity and location of the addressed device. The ID tool can then send a third radio message with a registration request command, again addressed to the selected installed device. In response, the selected installed device can enter a registration request mode and transmit an identification to a commissioning system, whereby that device's identity is now know to the system and can be wirelessly controlled.

18 Claims, 11 Drawing Sheets

(51) Int. Cl.
*H04W 76/11* (2018.01)
*H04W 76/14* (2018.01)
*H05B 47/195* (2020.01)
*H05B 47/11* (2020.01)
*H05B 47/105* (2020.01)

(52) U.S. Cl.
CPC ........... *H05B 47/105* (2020.01); *H05B 47/11* (2020.01); *H05B 47/195* (2020.01); *Y02B 20/40* (2013.01)

(56) References Cited

U.S. PATENT DOCUMENTS

| | | | | |
|---|---|---|---|---|
| 9,332,622 | B1* | 5/2016 | Dutt | H05B 47/19 |
| 10,045,415 | B1* | 8/2018 | Coombes | H05B 47/195 |
| 2007/0192613 | A1* | 8/2007 | Amoroso | H04L 67/26 |
| | | | | 713/179 |
| 2008/0218087 | A1* | 9/2008 | Crouse | H05B 37/0245 |
| | | | | 315/131 |
| 2009/0100132 | A1 | 4/2009 | Ebrom et al. | |
| 2011/0080091 | A1* | 4/2011 | Staab | H05B 47/105 |
| | | | | 315/61 |
| 2012/0306621 | A1* | 12/2012 | Muthu | H05B 47/19 |
| | | | | 340/8.1 |
| 2012/0309531 | A1* | 12/2012 | Gong | H03K 17/955 |
| | | | | 463/36 |
| 2013/0093324 | A1* | 4/2013 | Brown | B60Q 11/002 |
| | | | | 315/77 |
| 2013/0121193 | A1* | 5/2013 | Tapia | H04W 36/22 |
| | | | | 370/252 |
| 2013/0221203 | A1 | 8/2013 | Barrilleaux | |
| 2014/0015415 | A1* | 1/2014 | Lim | H05B 47/175 |
| | | | | 315/131 |
| 2014/0235265 | A1* | 8/2014 | Slupik | H04M 1/72415 |
| | | | | 455/456.1 |
| 2015/0115805 | A1 | 4/2015 | Henig et al. | |
| 2015/0137699 | A1* | 5/2015 | Killo | H05B 47/19 |
| | | | | 315/291 |
| 2015/0195883 | A1* | 7/2015 | Harris | H05B 45/12 |
| | | | | 315/155 |
| 2015/0220428 | A1* | 8/2015 | Simonyi | G06F 12/0207 |
| | | | | 340/2.26 |
| 2015/0250042 | A1 | 9/2015 | Aggarwal et al. | |
| 2015/0264723 | A1* | 9/2015 | Cheng | H04W 8/005 |
| | | | | 455/41.2 |
| 2015/0290808 | A1* | 10/2015 | Renkis | H04N 7/18 |
| | | | | 700/257 |
| 2016/0218804 | A1* | 7/2016 | Raj | H04B 10/1149 |
| 2016/0234917 | A1* | 8/2016 | Lim | H05B 37/02 |
| 2016/0286624 | A1* | 9/2016 | Patel | G01S 5/16 |
| 2016/0323972 | A1* | 11/2016 | Bora | F21V 7/00 |
| 2016/0323982 | A1* | 11/2016 | Ku | H04W 4/80 |
| 2017/0041886 | A1* | 2/2017 | Baker | H04W 4/80 |
| 2017/0245351 | A1* | 8/2017 | Leinen | H05B 47/19 |
| 2018/0014389 | A1* | 1/2018 | Cheung | H01H 21/02 |
| 2018/0063927 | A1* | 3/2018 | Abraham | H05B 37/0272 |
| 2018/0359604 | A1* | 12/2018 | Chen | G01S 5/02 |
| 2019/0200405 | A1* | 6/2019 | Gupta | H04W 76/11 |
| 2019/0261494 | A1* | 8/2019 | Cheung | H05B 45/20 |
| 2019/0288554 | A1* | 9/2019 | Baker | H02J 13/00019 |
| 2020/0044886 | A1* | 2/2020 | Jessen | G05D 1/0274 |

OTHER PUBLICATIONS

Industrial Clerk, Inc., "Flashforge Observer—3D Scanner", Retrieved from http://industrialclerk.com/flashforge-observer-3d-scanner.html?gclid=Cj0KEQiAhs3DBRDmu-rVkuif0N8BEiQAWuUJr2dTBOHpv3WB9xRxY6_9Fn6WlmD8mg, Known to exist as of Jan. 9, 2017, p. 2.

B & H Foto & Electrics, Corp., "FUEL3D Scanify Handheld 3D Scanner", Retrieved from https://www.phphotovideo.com/bnh/controller/home?O=&sku=1115965&gclid=Cj0KEQiAhs3DBRDmu-rVkuif0N8BEiQAWuUJryMqMoMm58p7HSAefyadOVvXs6RUY, Known to exist as of Jan. 9, 2017, p. 12.

Staples, Inc., "ISENSE 3D Scanner", Retrieved from http://www.staples.com/iSense-3D-Scanner/product_1435033, Known to exist as of Jan. 9, 2017, p. 7.

Matterport, "Mobile Capture With Matterport 3D", Retrieved from https://matterport.com/mobile-3d-capture/, Known to exist as of Apr. 22, 2016, p. 4.

Occipital, Inc., "Structure Sensor Capture the World in 3D", Retrieved from https://store.structure.io/store?_ga=1.132507019.460043265.1483634164, Sep. 17, 2013, p. 5.

Google, Inc., "Tango", "Retrieved from https://get.google.com/tango/", Known to exist as of Jun. 9, 2016, p. 10.

Young, Lee W., "International Search Report and Written Opinion Re Application No. PCT/US16/56105", Dec. 22, 2016, p. 8.

Quill Lincolnshire, Inc., "XYZ 3D Handheld Scanner", Retrieved from http://www.quill.com/xyz-3d-handheld-scanner/cbs/51856068.html?hidedisruptive=1&cm_mmc=SEM_PLA_NULL_51856068&mcode=SEM_PLA_NULL_5185606, Known to exist as of Jan. 9, 2017, p. 2.

* cited by examiner

RADIO BASED SMART DEVICE IDENTIFICATION TOOL FOR COMMISSIONING

CLAIM OF PRIORITY UNDER 35 U.S.C. § 119

The present Application for Patent claims priority to Provisional Application No. 62/419,729 entitled "RADIO BASED SMART DEVICE IDENTIFICATION TOOL FOR COMMISSIONING" filed Nov. 9, 2016, and assigned to the assignee hereof and hereby expressly incorporated by reference herein.

FIELD OF THE DISCLOSURE

The present disclosure relates generally to smart networks of devices. In particular, but not by way of limitation, the present disclosure relates to systems, methods and apparatuses for commissioning smart devices via a radio-based commissioning tool.

DESCRIPTION OF RELATED ART

In a wireless lighting control system, the exercise of establishing the behavior of the lights, sensors, switches, and any other devices is referred to as commissioning. This can include but is not limited to the identification of the devices, "pairing" devices that are meant to act together or from each other, physical location, and the storage of the information in a central location. This commissioning process allows an organized means of establishing how these devices should act as well as organizing them into logical groups. This also aids in the changing of the groups and behaviors in the future given that everything is identified and located at the time of commissioning.

SUMMARY OF THE DISCLOSURE

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Some embodiments of the disclosure may be characterized as a method for wireless non-line-of-sight commissioning of installed smart devices. The method can include broadcasting, via a plurality of installed smart devices, a first radio message unique to each of the plurality of installed smart devices. The method can further include collecting, via an identification tool, those of the first radio messages reaching the identification tool with at least a threshold radio signal strength. The method can also include sorting, via the identification tool, the first radio messages by signal strength. The method can yet further include selecting, via the identification tool, one of the first radio messages to respond to. This radio message can be referred to as a selected first radio message, and optionally may be selected as the one of the first radio messages having the greatest signal strength. The method can also include sending, via the identification tool, a second radio message with an address generated based on a unique identifier of the selected first radio message. The address can be uniquely associated with a one of the installed smart devices that broadcasted the selected first radio message. The one of the installed smart devices can be referred to as a first selected device. The method can further include receiving a response to the second radio message at the identification tool from the first selected device. What is more, the method can include sending a third radio message with the address, via the identification tool. The third radio message can include an instruction for the first selected device to enter a registration request mode. In the registration request mode, the first selected device is configured to send a fourth radio message including at least an identification of the first selected device, but optionally also a location of the first selected device. The method can further include receiving a fourth radio message from first selected device at a commissioning system, the fourth radio message including a location and identification of the first selected device. The method can yet also include storing in memory, via the commissioning system, the identification, and optionally the location, of the first selected device. The first selected device can terminate broadcasting its first radio message at or after the receiving a response to the second radio message. The commissioning system can respond to the fourth radio message with a fifth radio message, addressed to either or both of the first selected device and the identification tool. This fifth radio message can inform either or both of these devices that the first selected device is registered or commissioned. Further, the identification provided in the fourth radio message can henceforth be used to provide instructions to the first selected device (e.g., wireless commands to turn a light on or off). Optionally, the identification tool can use this fifth radio message to remove the first selected device from a list of first radio signals to be addressed for commissioning.

Other embodiments of the disclosure may also be characterized as an identification tool. The identification tool can include a processing portion with one or more processing components therein and a memory coupled to the processing portion. The identification tool can also include a registration module stored on the memory and executable on the processing portion to: collect first radio messages, from a plurality of installed smart devices, reaching the identification tool with at least a threshold radio signal strength. Each of the first radio messages can be unique to a one of the plurality of installed smart devices. The registration module can further be executable to sort the first radio messages by signal strength and select one of the first radio messages to respond to, this being a selected first radio message. The registration module can further be executable to send a second radio message with an address generated based on a unique identifier of the selected first radio message. The address can be uniquely associated with a one of the installed smart devices that broadcasted the selected first radio message, and the one of the installed smart devices can be referred to as a first selected device. The registration module can further be executable to receive a response to the second radio message from the first selected device. The registration module can further be executable to send a third radio message with the address. The third radio message can be addressed to the first selected device and can include an instruction for the first selected device to enter a registration request mode. In the registration request mode, the first selected device can send a fourth radio message to a commissioning system, and the fourth radio message can include an identification of the first selected device.

Other embodiments of the disclosure can be characterized as a system for non-transitory, tangible computer readable storage medium, encoded with processor readable instructions to perform a method for wirelessly, and without line-of-sight, commissioning installed smart devices. The method can include collecting first radio messages, from a plurality of installed smart devices, reaching an identification tool with at least a threshold radio signal strength, each of the first radio messages being unique to a one of the plurality of installed smart devices. The method can also include sorting the first radio messages by signal strength. The method can yet further include selecting one of the first radio messages to respond to, this being a selected first radio message. The method can also include sending a second radio message with an address generated based on a unique identifier of the selected first radio message, the address being uniquely associated with a one of the installed smart devices that broadcasted the selected first radio message. The one of the installed smart devices can be a first selected device. The method can also include receiving a response to the second radio message from the first selected device. The method can yet further include sending a third radio message with the address. The third radio message can be addressed to the first selected device and can include an instruction for the first selected device to enter a registration request mode. In the registration request mode, the first selected device can send a fourth radio message to a commissioning system, and the fourth radio message can include an identification of the first selected device.

BRIEF DESCRIPTION OF THE DRAWINGS

Various objects and advantages and a more complete understanding of the present disclosure are apparent and more readily appreciated by referring to the following detailed description and to the appended claims when taken in conjunction with the accompanying drawings:

DETAILED DESCRIPTION

Figure 1:
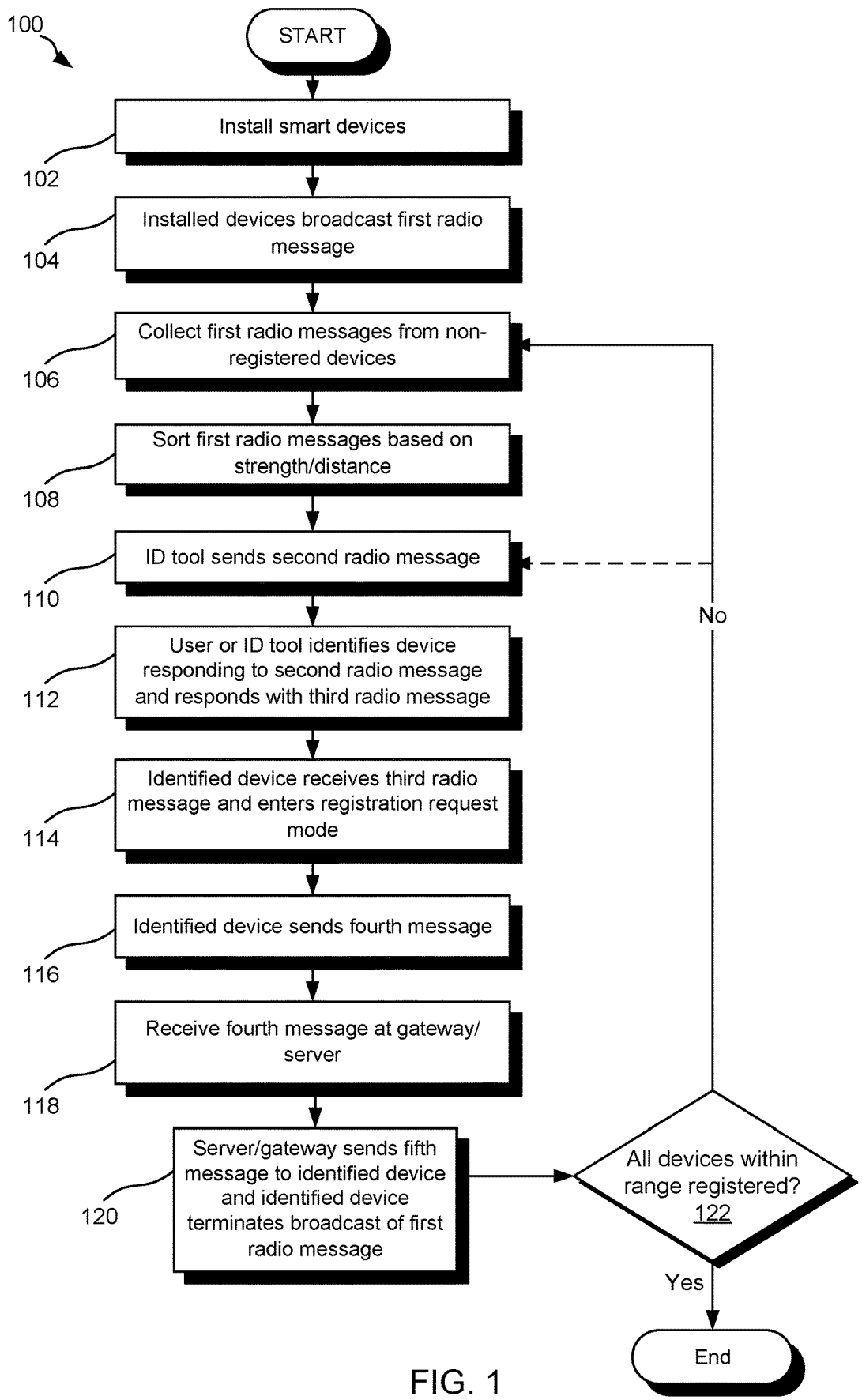
FIG. 1 illustrates an embodiment of a method of operating a radio based ID tool to commission devices in a new install or remodel.

When installing a new system comprised of smart lights (e.g., lighting controllers), sensors (e.g., temperature, motion, moisture), switches, and other 'smart' devices, each device has a unique ID (e.g., stored on a memory of the device) that allows it to be differentiated from the other devices in the system. However, the unique IDs alone do not provide sufficient information to identify devices during commissioning. Two known methods for obtaining the necessary further information include (1) pre-commissioning the system, or pre-registering the devices, prior to installation, or (2) having ID stickers on the devices, the floor, and on maps to correlate the devices with a location. The main drawback for these methods is that the devices must then be placed in the locations originally assigned during the pre-commissioning to ensure the proper identification of the devices and their locations. If a pallet of devices is delivered to an installer, there is a possibility of mixing up devices, making this identification process more difficult and fraught with the chance of errors.

Further, these pre-commissioning processes remove flexibility during installation, and may require that some assumptions be made at the factory. For instance, deciding which devices are to be grouped together may have to be made before devices are shipped out to the installation site. On-site rearrangement of devices, or the addition of devices to a room can become challenging if not impossible.

A method that avoids pre-commissioning uses an IR (Infrared) based commissioning tool (or "IR tool"). The IR tool can be used to arbitrarily place devices into the installation without regard to the location of the devices or their ID. At the time of commissioning, the IR tool can be used to place a device into a "registration request" mode whereby a controller for the device (e.g., a lighting controller) can send out a radio beacon that lets the system know that the device wants to be registered. This beacon contains an ID of the IR tool which indicates which IR tool (if there is more than one) put the device into the registration request mode. After this device has been singled out, it can then be identified and associated with or assigned a physical location in the system through a web portal on the server. A drawback of the IR tool is that its line-of-sight requirement can create challenges where the device is in a ceiling or otherwise obscured from direct IR communication.

Solution

This disclosure describes a radio based ID tool that overcomes the line-of-sight challenges of the IR method. The radio based ID tool allows the installer to install the devices as with the IR method, without regard to the ID of the device. However, unlike the IR method, the radio based ID tool alleviates the need for line-of-sight communication between the tool and the devices (e.g., lights).

On the other hand, use of a radio based ID tool creates its own challenges since many factors can disrupt and mislead interpretations of relative signal strength (e.g., reflections, concrete walls, and human bodies interacting with the radio waves). This makes it difficult to filter and identify nearby devices.

By having the installed devices broadcast unique identifications, and then using these identifications to send a unique instruction back to only one of the installed devices, commissioning via radio can be effectively implemented despite the limitations of filtering installed devices based on radio signal strength.

The radio based ID tool can include a microprocessor, radio, power source, and touchscreen interface. For instance, a tablet, smartphone, or other common consumer electronic communication or computing device can embody the radio based ID tool. In these cases, a specialized app is likely to implement the radio based ID tool.

FIG. 1 illustrates a method of operating the radio based ID tool (hereinafter "ID tool") to commission devices in a new install or remodel. Smart devices can be installed (Block 102) and when powered, can periodically broadcast a first radio message indicating that a given device is newly-installed and has yet to be identified (this can be referred to as an out of the box mode) (Block 104). As the ID tool is moved throughout a structure/building being commissioned, the ID tool can collect the first radio messages from non-registered devices (Block 106) (since registered devices do not broadcast the first radio message) and sort the first radio messages (Block 108). This sorting can be displayed on a user interface of the ID tool and can be ordered in terms of signal strength or distance from the ID tool, to name two non-limiting examples. The collecting (Block 106) can be performed either in a "live mode," where the first radio messages can be started and stopped, or in a "capture mode," where the data can be collected for a period of time when the user of the ID tool initiates the capture mode. The strongest signals can be grouped together and considered to be associated with installed devices in the immediate area or in a current room. For instance, a threshold signal strength or distance can be used to group devices. In other instances, a linear drop off in signal strength can be used to identify a first group of nearby devices, and these can be separated from devices that show a nonlinear drop off in signal strength relative to the first group. Such a nonlinear drop off can occur when a wall or other structure impedes signal strength. Thus, measuring rates of signal strength drop off can be used as an indicator of installed devices that are in or out of the current room. In other cases, phased arrays of transmission sources and/or a phased array of reception devices can be used to more accurately locate the source(s) of the first radio message. Sorting by signal strength can also provide an ordered list of installed devices, allowing the ID tool to select a next installed device for registration based on the installed device in the ordered list having the highest signal strength.

The first radio messages are unique to each device and include an identification or address for each device. As such, the first radio messages provide a way for the ID tool to address a selected installed device without addressing others of the devices. In some cases, the ID tool can select the first radio message with the strongest signal, and address a second radio message to a device broadcasting this selected first radio message. The ID tool can broadcast the second radio message (e.g., a "blink" instruction) with an address extracted from the selected first radio message or based on a unique identifier in the selected first radio message (Block 110). The installed device that broadcasts the selected first radio message can also be referred to as a first selected device. The second radio message is typically wireless, though in some cases, a visual or IR signal can be transmitted by the ID tool.

In embodiments where knowledge of exact locations of each installed device are not needed (e.g., lights in a conference room where only a general location need be known), the second radio message can be addressed to a group of devices. In this embodiment, the installed devices in the group may be registered as a group and thus each be considered to share a common location (e.g., Conference Room East, or Kitchen).

The second radio message, can be received by the first selected device and can trigger the first selected device to respond with a visual cue or radio cue that is returned to the ID tool. For instance, if the first device is a light, or has a built-in LED indicator, this light or LED indicator can blink so that a user or visual sensor of the ID tool can detect and identify the physical location and identity of the first device. This can be referred to as a response to the second radio message.

In response to the response, the ID tool can broadcast a third radio message (Block 112). In one embodiment, the ID tool can monitor for the response using an optical sensor. In another embodiment, a user can spot the response (e.g., an installed device that is blinking), and indicate this on a user interface of the ID tool.

This third radio message is again addressed to the first selected device and instructs the first selected device to enter a "registration request" mode (Block 114). In this way, a single installed device at a time can be instructed to enter the "registration request" mode. Now in "registration request" mode, the first selected device can broadcast a fourth radio message including an ID of the first selected device, a location of first selected device, and an ID of the ID tool (Block 116). The fourth radio message can be received by a nearest gateway (e.g., WiFi access point) and passed to a server responsible for storing information about and managing registered devices (Block 118). In particular, the server can host a commissioning system. Alternatively, the ID tool can host the commissioning system. Thus, the commissioning system, can "see" the first selected device, optionally its location, as well as the ID tool being used to commission the first selected device. In an embodiment, the ID tool may determine a location of the first selected device and send this location to the commissioning system. The ID or name of the first selected device, along with a location thereof, can be can be assigned to the first of the plurality of installed devices either via the ID tool or another device or interface in communication with the commissioning system (e.g., a web portal accessed on a desktop computer or a tablet computer). In another embodiment, a location of the first selected device may be displayed on a digital map or 3D model of the structure. For instance, a computer device can automatically display a location of the first selected device on a digital map or 3D model, or a user can 'drag and drop' a digital representation of the first selected device name or ID onto a location on the digital map or 3D model. This visualization of device locations makes it simpler to group multiple installed devices and group them by room or function.

The commissioning system can store the location and ID of the first selected device in a memory (e.g., a memory of the server).

The server can then send a fifth message via the gateway to the first selected device thereby registering the first selected device, at which point the first selected device can terminate broadcasting the first radio message (Block 120). Alternatively, termination of the first radio message from the first selected device can occur any time after the ID tool receives the response to the second radio message. Going forward, the now-registered device will no longer be a candidate for identification and the ID tool will not address it. The ID tool can either exclude the first selected device from further actions, or since the ID tool only attempts to register installed devices broadcasting the first radio message, it may not be aware of and thus able to re-register the first selected device once it stops broadcasting the first radio message.

In embodiments where knowledge of exact locations of each device are not needed (e.g., lights in a conference room), the third radio message can be broadcast with the IDs of a group of devices such that the group of devices enters the registration request mode at the same time, rather than one-by-one. These devices can respond with the fourth radio message, and then names (e.g., CR1, CR2, etc.), and rough locations can be assigned to responding devices.

The method 100 then determines if all devices within range of radio detection have been registered (Decision 122) and if not, the method 100 returns to collecting the first radio messages (Block 106). Alternatively, the ID tool can work with the existing list of first radio messages and send the second radio message (Block 110) addressed to a next non-registered device in the list. Since registered devices do not broadcast the first radio message, the ID tool can only see first radio messages from non-registered devices. As more and more devices are registered, the number of devices broadcasting the first radio message decreases. Eventually, decision 122 finds that there are no other first radio messages within range and thereby determines that all devices within range have been identified. At this point, a user can move the ID tool to a new room, or an automated platform can move the ID tool to a new room. Alternatively, the ID tool can be moved until the ID tool begins detecting the first radio message from at least one new installed device.

The user has the ability to set the tool ID on the user interface of the ID tool. This is helpful in cases where there is more than one person identifying devices, and there may be a need to tell which person is working with a particular device.

In an embodiment, the non-registered devices can continue to transmit the first radio message until a selected device responds with the third radio message. In another embodiment, the non-registered devices can continue to transmit the first radio message until the fourth radio message is sent to the installed device being registered. In another embodiment, each non-registered device can continue to transmit the first radio message until that installed device is registered.

Figure 2:
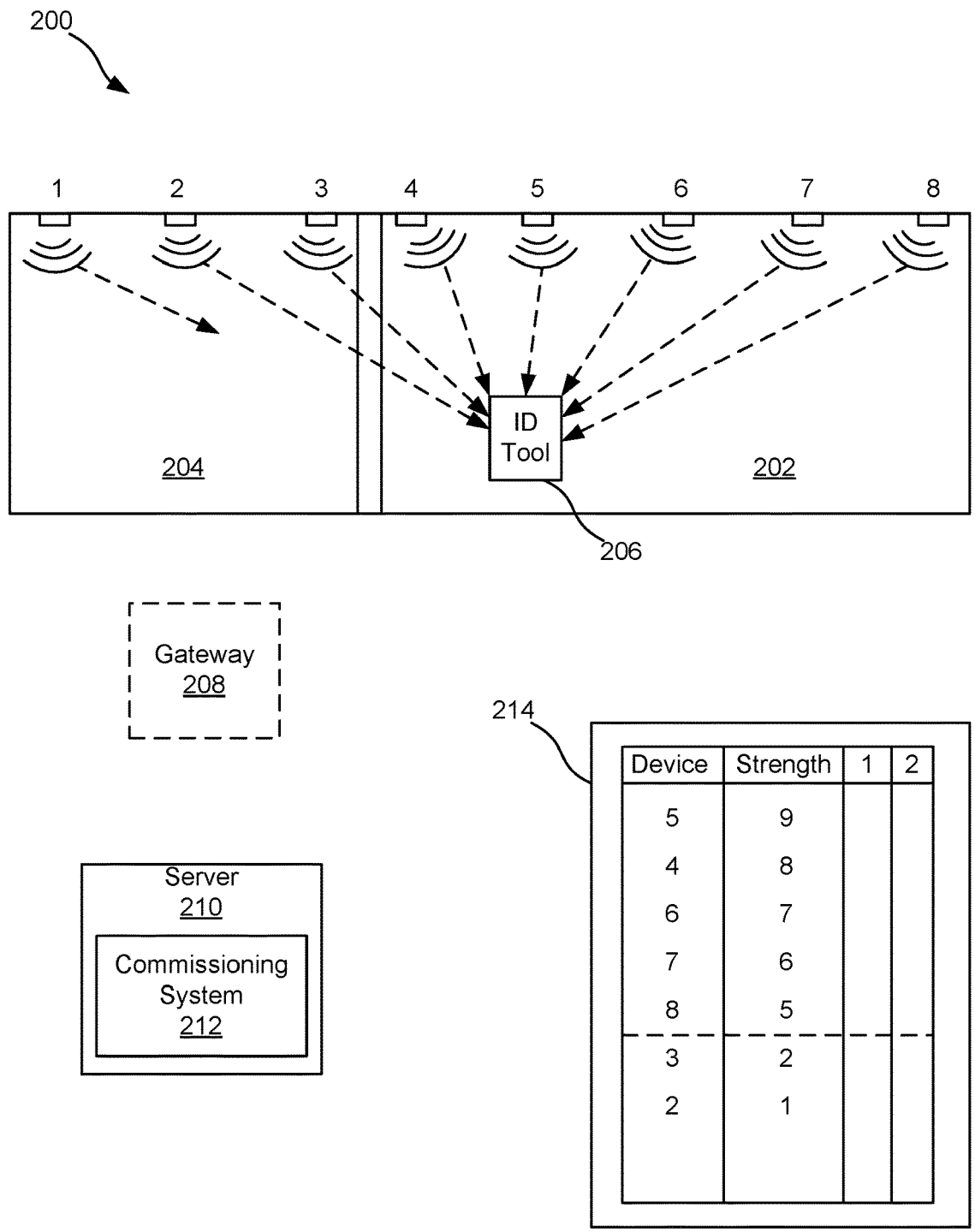
FIG. 2 illustrates an embodiment of a system and user interface including the ID tool and a plurality of installed devices being commissioned.

FIGS. 2-8 illustrate a system and user interface including the ID tool and a plurality of installed devices being commissioned. In particular, FIG. 2 illustrates the ID tool 206 in a first of two rooms of a structure. The first room 202 in which the ID tool 206 is in has five devices mounted on the ceiling, while a second room 204 has three ceiling-mounted devices. These could be lights, sensors, controllers, or any other smart devices. FIG. 2 also illustrates a user interface 214 of the ID tool.

Once installed and powered, the devices 1-8 can broadcast a first radio message. The ID tool 206 can receive some or all of these broadcasts. For instance, the illustrated user interface 214 shows that all but one of the eight devices is detected by the ID tool 206 in its current position (e.g., the signal strength of device 1 is too weak for the ID tool 206 to recognize/detect). The ID tool 206 can sort the signals from the devices according to strength (or distance), and then group the devices based on the signal strengths. In this case, there is a linear drop off in the signal strength of devices 4-8, but devices 2 and 3 show a nonlinear drop off in strength relative to devices 4-8. Thus, the ID tool 206 may group devices 4-8 into a first group (e.g., group A), and devices 2 and 3 into a second group (e.g., group B). The groups may refer to rooms or other structures within the overall structure. However, in other embodiments, the groups may be based on other factors. For instance, lights and light switches may be separately grouped, or lights controlled by a given switch may be grouped, even where multiple groups of lights and switches occur in the same room. Other variations on groupings are also possible.

Figure 3:
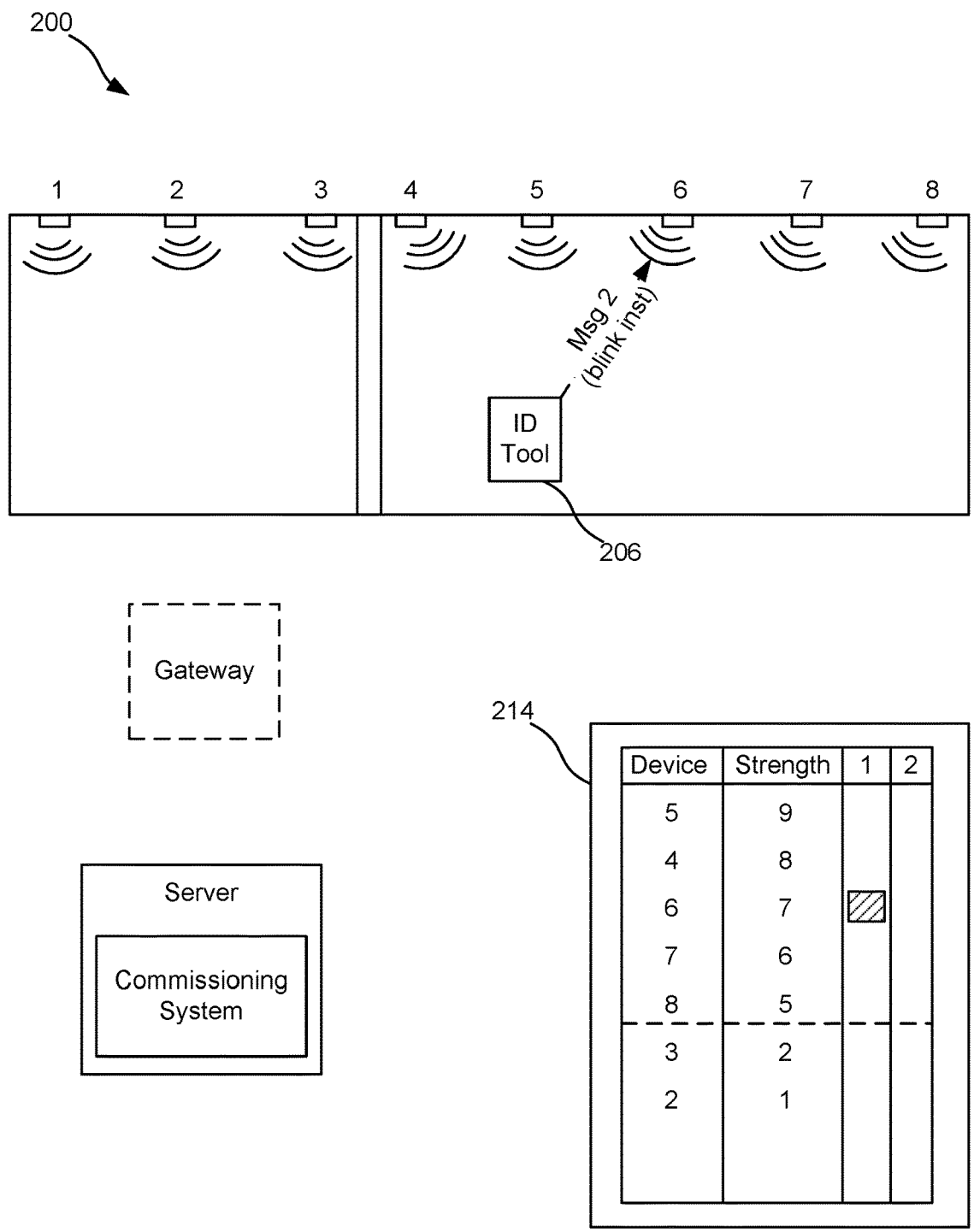
FIG. 3 illustrates a second state of the system of FIG. 2.

In FIG. 3 the ID tool can then send a second radio message or blink instruction that triggers one of the plurality of installed devices in a selected group (e.g., group A) to respond with a message such as luminous blinking that the user or ID tool 206 can use to identify the physical location of the one of the plurality of installed devices. The user interface 214 shows two columns of buttons or triggers labeled "1" and "2", where the first column can be used to trigger the second radio message. Here, one sees that the first column has been triggered relative to device 6 (although the user and ID tool 206 do not know which device in the room is associated with this device ID yet). The second radio message can be addressed to whichever installed device provided the corresponding ID seen on the user interface. In other words, the user and ID tool 206 do not know which installed device the second radio message is being addressed to. Said another way, the radio signal of the second radio message may still reach multiple installed devices, but it will only be recognized by device 6.

Figure 4:
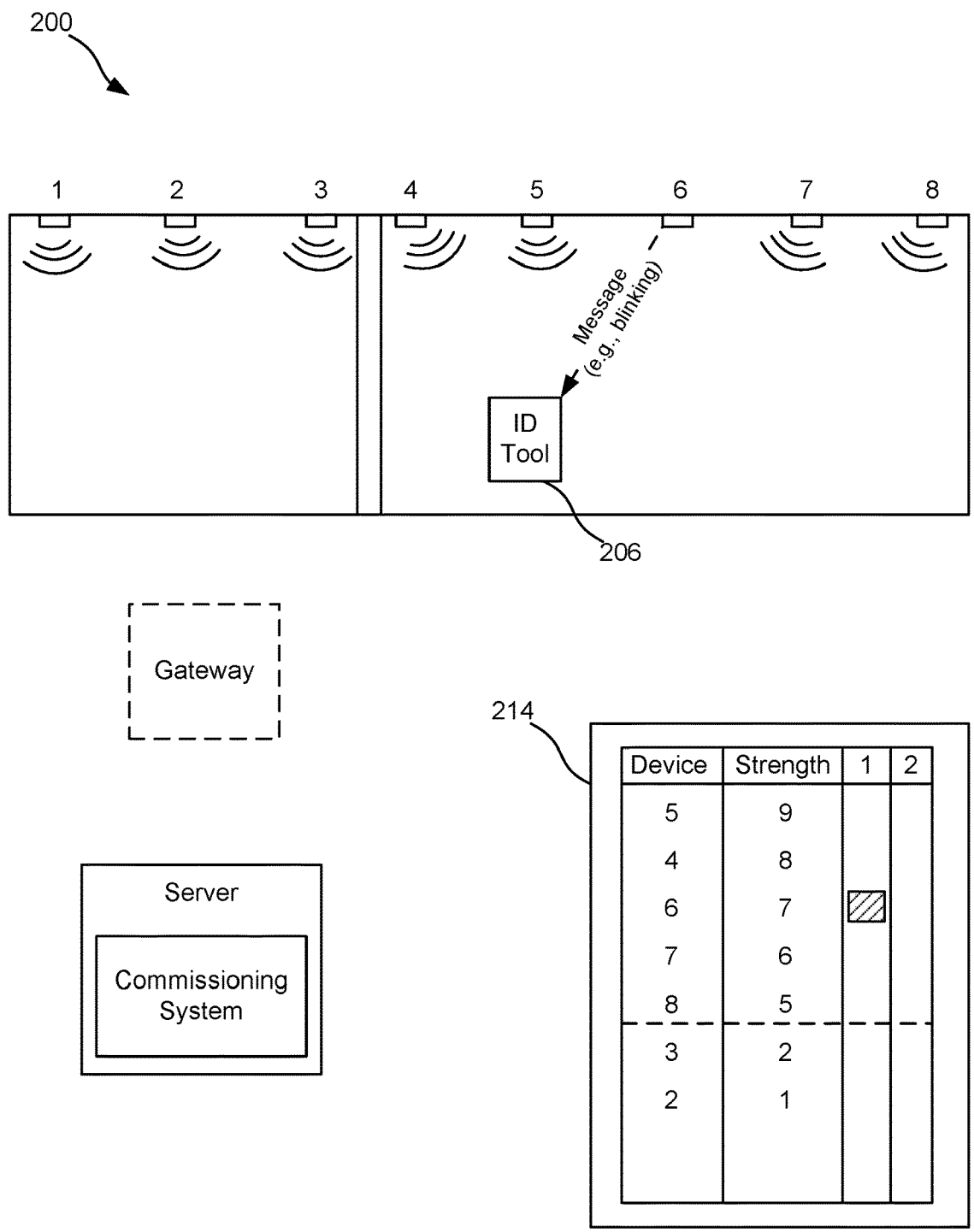
FIG. 4 illustrates a third state of the system of FIG. 2.

However, in FIG. 4 the identified device responds with a message such as blinking a light that makes clear to the user or visual sensor of the ID tool 206 where the physical location of the device is. The location can optionally be recorded, for instance by the user pressing a button on the user interface 214 corresponding to a device location or dragging a digital representation of the device to a specific location on the user interface 214, for instance a location on a graphical map or 3D model.

Figure 5:
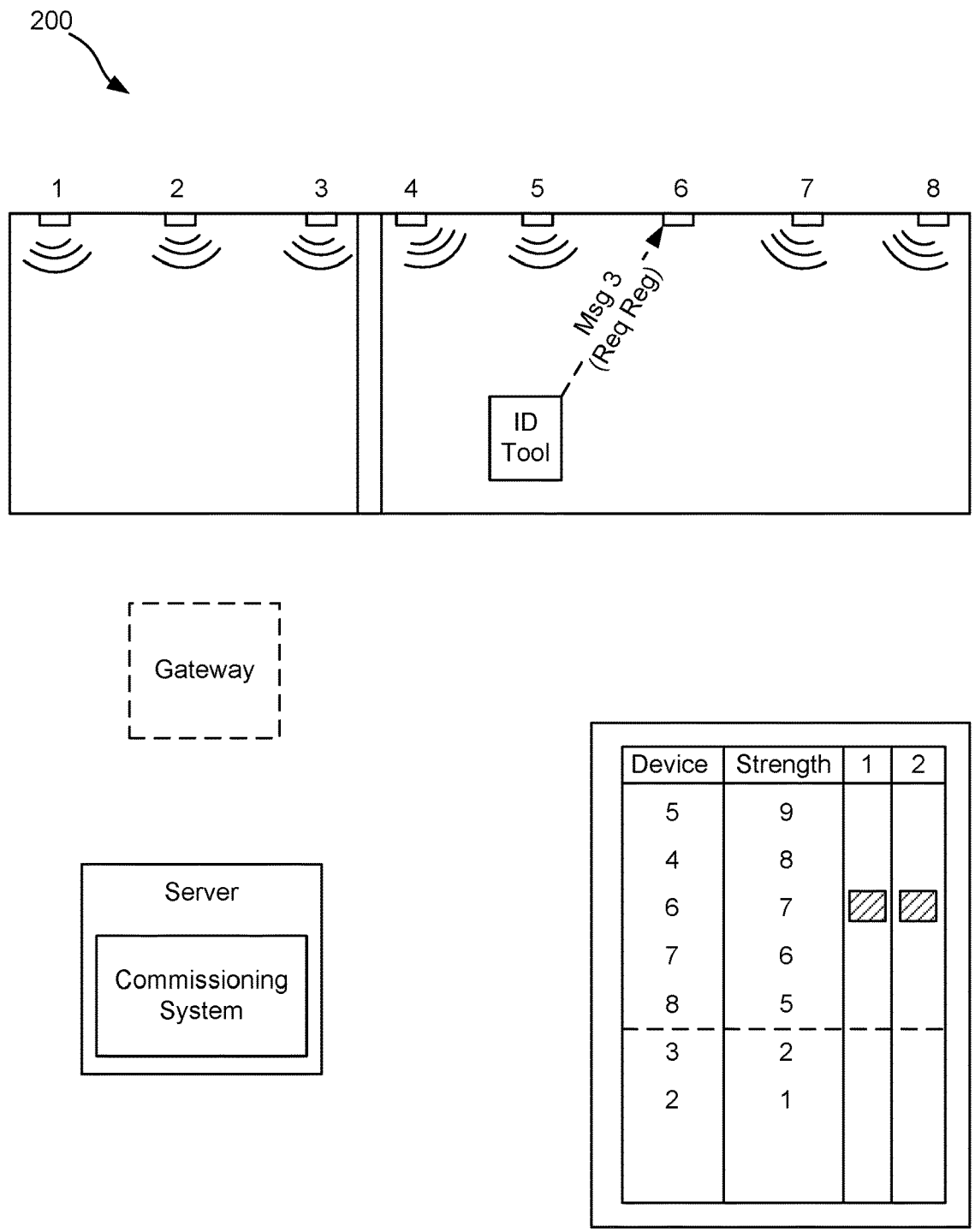
FIG. 5 illustrates a fourth state of the system of FIG. 2.

In FIG. 5 the ID tool 206 can then send a third radio message requesting registration of the device 6. The second column of the user interface 214 can be used to trigger the third radio message. This third radio message can also be addressed to device 6 such that only device 6 recognizes the third radio message. Upon receiving this third radio message, or request for registration, device 6 can enter a registration request mode.

Figure 6:
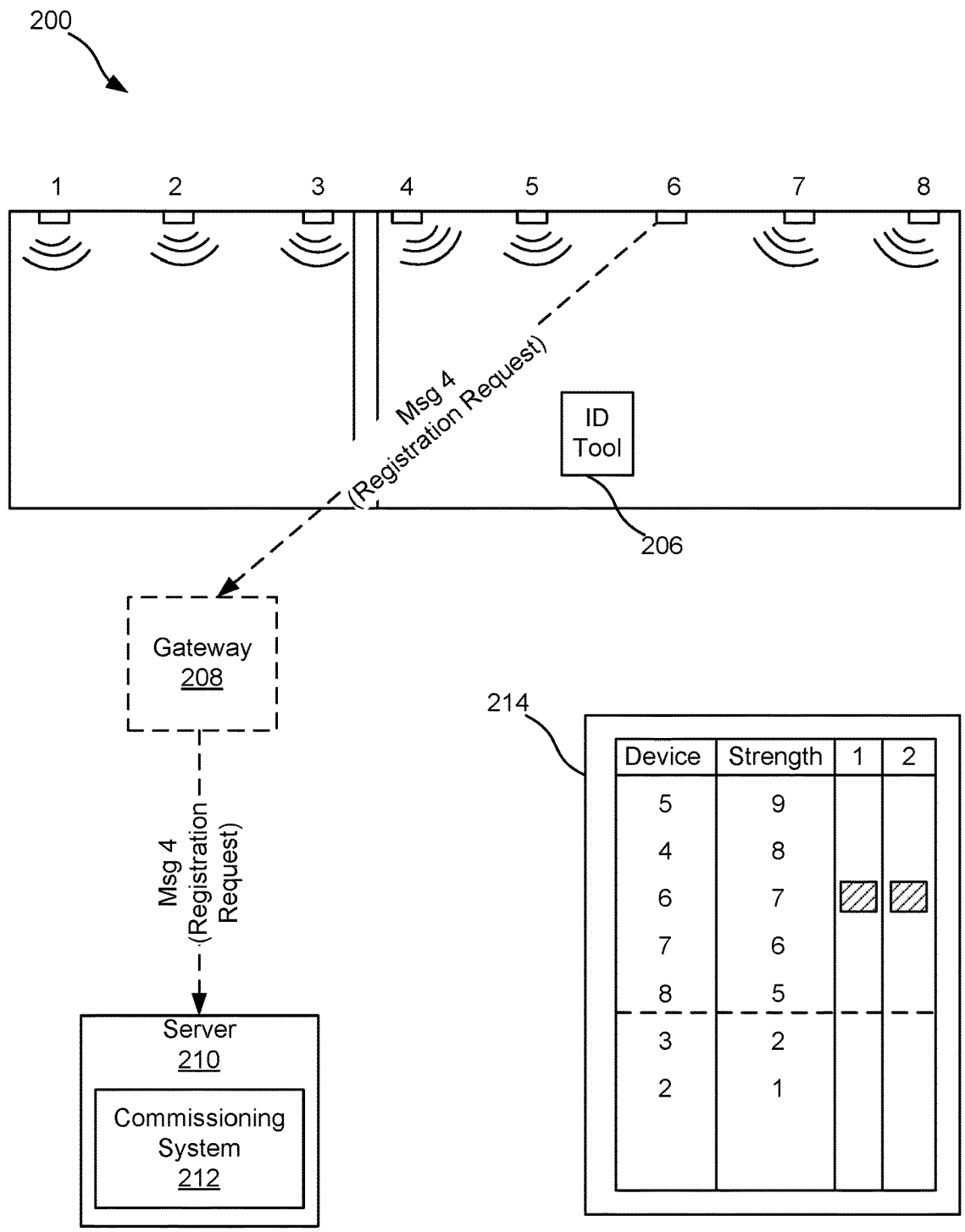
FIG. 6 illustrates a fifth state of the system of FIG. 2.

In FIG. 6 the identified device in the registration request mode can respond to the third radio message with a fourth radio message, which can also be called a registration request. This fourth radio message can be sent to the commissioning system 212 on a server 210, via the optional gateway 208, rather than via the ID tool 206. The server 210 can be part of the structure where the devices are located or can be remote therefrom. The server 210 can include one or more computing devices. The server 210 and the ID tool 206 may be in wireless communication.

In FIG. 6 the identified device in the registration request mode can respond to the third radio message with a fourth radio message, which can also be called a registration request. This fourth radio message can be sent to the commissioning system 212 on a server 210, via the optional gateway 208, rather than via the ID tool 206. The server 210 can be part of the structure where the devices are located or can be remote therefrom. The server 210 can include one or more computing devices. The server 210 and the ID tool 206 may be in wireless communication.

Figure 7:
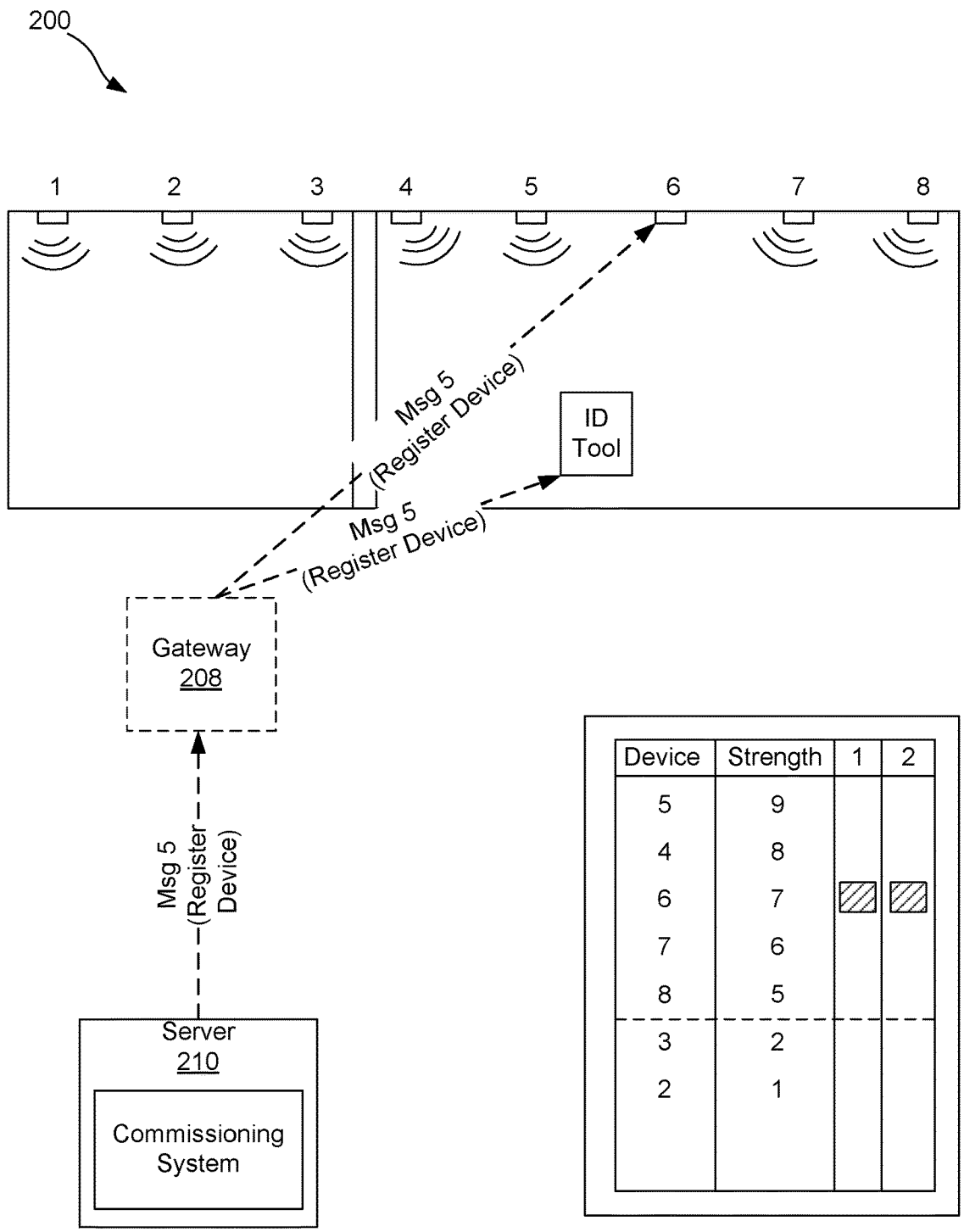
FIG. 7 illustrates a sixth state of the system of FIG. 2.

In FIG. 7, in response to the fourth radio message, the server 210 can pass a fifth radio message to the identified device, via the optional gateway 208. The fifth radio message can confirm with device 6 that registration is complete. Device 6 can now be considered registered as the commissioning system has both an ID of device 6 and a location of the device. The ID tool 206 can continue receiving first radio messages from non-registered devices and restart the process of registering a next device. The registered device 6 no longer transmits the first radio message and thus will not be considered in subsequent loops.

Figure 8:
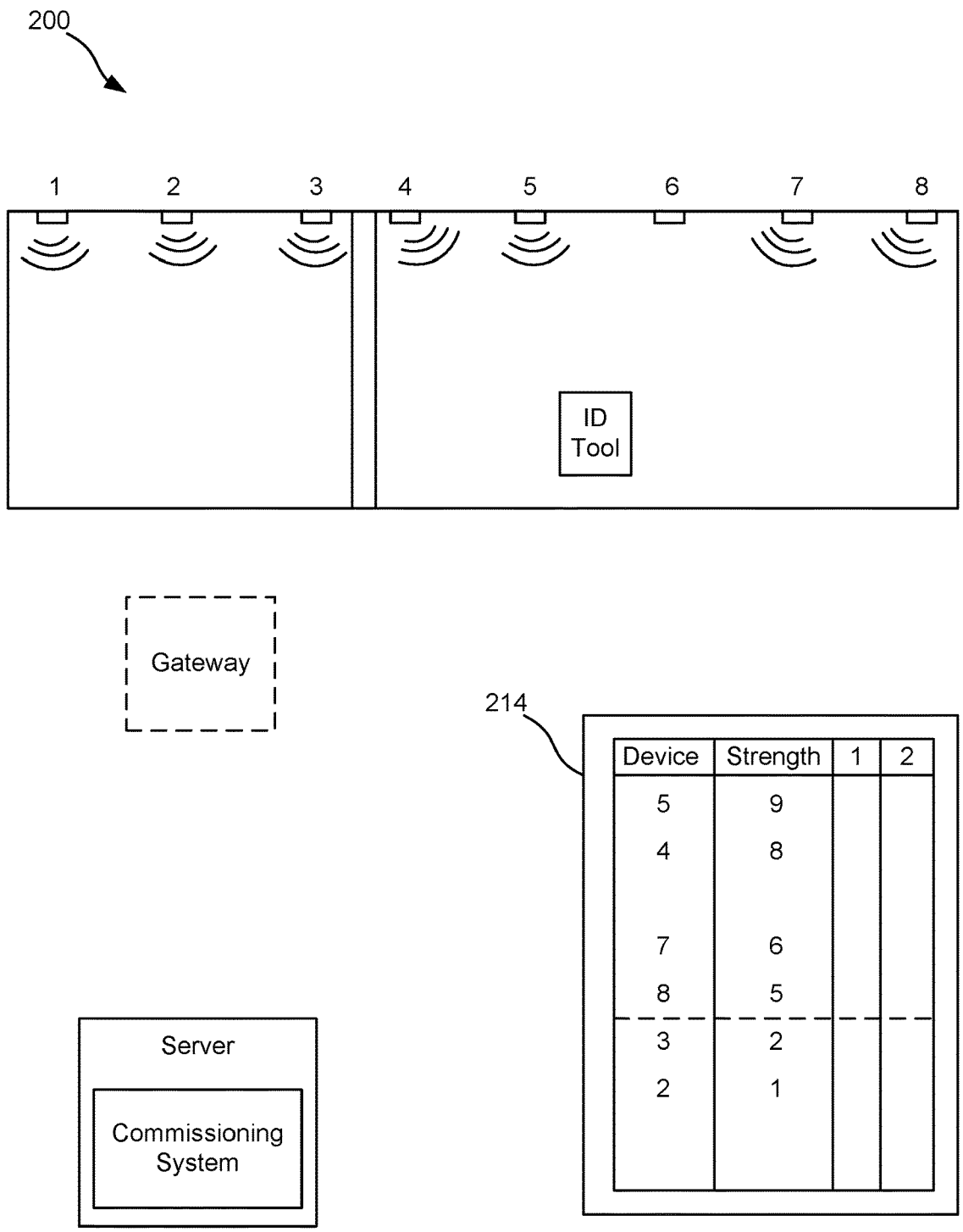
FIG. 8 illustrates a seventh state of the system of FIG. 2.

FIG. 8 illustrates that once device 6 is registered, it can stop transmitting the first radio message and device 6 can be removed from the user interface 214, or moved to a registered devices portion of the user interface 214. Alternatively, the ID tool 206 may no longer see device 6 since it has terminated transmission of its first radio message, and thus device 6 may no longer show up on the user interface 214.

Registered devices can terminate transmission of the first radio message at various times, including when second radio message is received (e.g., FIG. 4), or anytime between this and including receipt of the fifth radio message (e.g., FIG. 7).

The above series of steps can be repeated for other devices until all devices are registered. In an embodiment, a checking protocol can include the ID tool 206 sending a sixth radio message instructing all devices in a group to blink or provide another indication that they are registered. If the user or ID tool 206 observes that a device in a room or group of devices does not respond to this sixth radio message, then the user or ID tool 206 can seek to register those devices that did not respond. For instance, a user could send the sixth radio message once he/she believes that registration of lights in a room is complete, triggering the lights to blink. This can provide an easy visual aid to confirm that all lights in a room or group have been registered. Troubleshooting methods can be applied to any devices not responding to the sixth radio message.

The ID tool 206 can also be used for other purposes during commissioning. For instance, the ID tool 206 can (1) be used to commission small systems that do not contain gateways 208 or a server 210; (2) aid in the commissioning of repeaters and orphans in a larger system; and (3) aid in the registering of switches and sensors. For example, where a gateway 208 or server 210 is not available, the ID tool 206 can act as the server and host the commissioning system 212.

(1) Commissioning of Small Systems without Gateways or Servers

A typical larger installation will be comprised of controllers, sensors and switches, gateways, and the server. The gateway serves as an interface between the server and the end devices (controller, sensors and switches). Commissioning data is passed through the gateway to the end devices, and data is also collected back through the gateway.

In cases where a smaller system is needed, comprised of only controllers, sensors, and switches, a gateway may not be desired. The server is also not present in this type of system. Without a means of sending and receiving messages to and from the end devices (via the gateway and server), the ID tool can be used to facilitate the commissioning process. In other words, the ID tool performs all communications with non-registered and registered devices.

The commissioning process, whether carried out with a gateway and server or not, can include the following: identifying device controllers; identifying sensors; identifying switches; commissioning the sensors and switches to the controllers; commissioning settings to the controllers (timings and behavior); collecting and archiving all data from the system; and testing the system.

(2) Commissioning Repeaters and Orphans in Larger Systems

It is likely at some point that there will be a sensor, switch, light controller, or other device that will be out of radio contact with the nearest gateway. Rather than add the expense of an additional gateway, the nearest device (e.g., a light controller) can be used as an intermediary or repeater for the "orphaned" device. In other words, a nearest device can send and receive data from the orphaned device and thereby extend the range of a nearest gateway.

The process of identifying these orphaned devices and the appropriate nearby device (e.g., light controller) to act as the repeater can be difficult to accomplish from a user interface (e.g., a web portal) of the commissioning system on the server. So, a user interface of the ID tool can be used to find orphaned devices.

Registering orphaned devices can include, but is not limited to, the following: identifying orphaned devices; identifying orphaned sensors; identifying nearby devices that can be used as repeaters; placing each of the orphaned devices into a repeat mode; facilitating pairing of a repeater with each orphaned device; sending info back through the repeating device to the server about the new repeater and orphaned device.

(3) Registering Switches and Sensors

Figure 9:
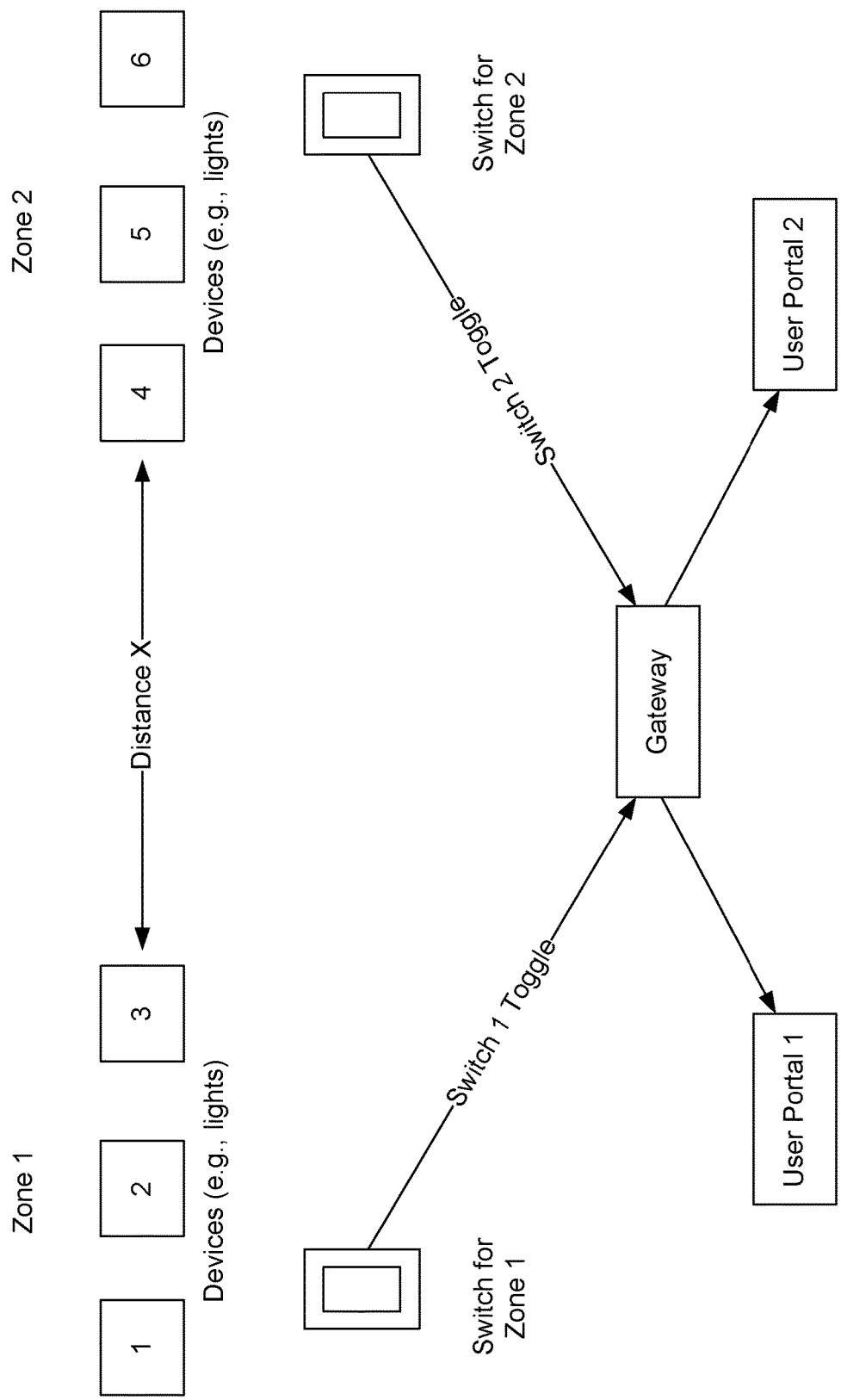
FIG. 9 illustrates an embodiment of a system for commissioning multiple zones of devices and switches.

Registering switches can present a challenge when two users are registering switches at the same time. FIG. 9 illustrates a situation where switches are arranged in two separate zones of a structure (e.g., two different rooms), and where each zone is controlled by a respective switch (Zone 1=devices 1-3 and Zone 2=devices 4-6). If zone 1 is being registered by a first user via portal 1, and zone 2 is being registered by a second user via portal 2, and both users activate or toggle their respective switches at the same time, or at nearly the same time, the gateway receives both radio signals, and both portals are presented with two radio signals, but no way to distinguish the two.

Figure 10:
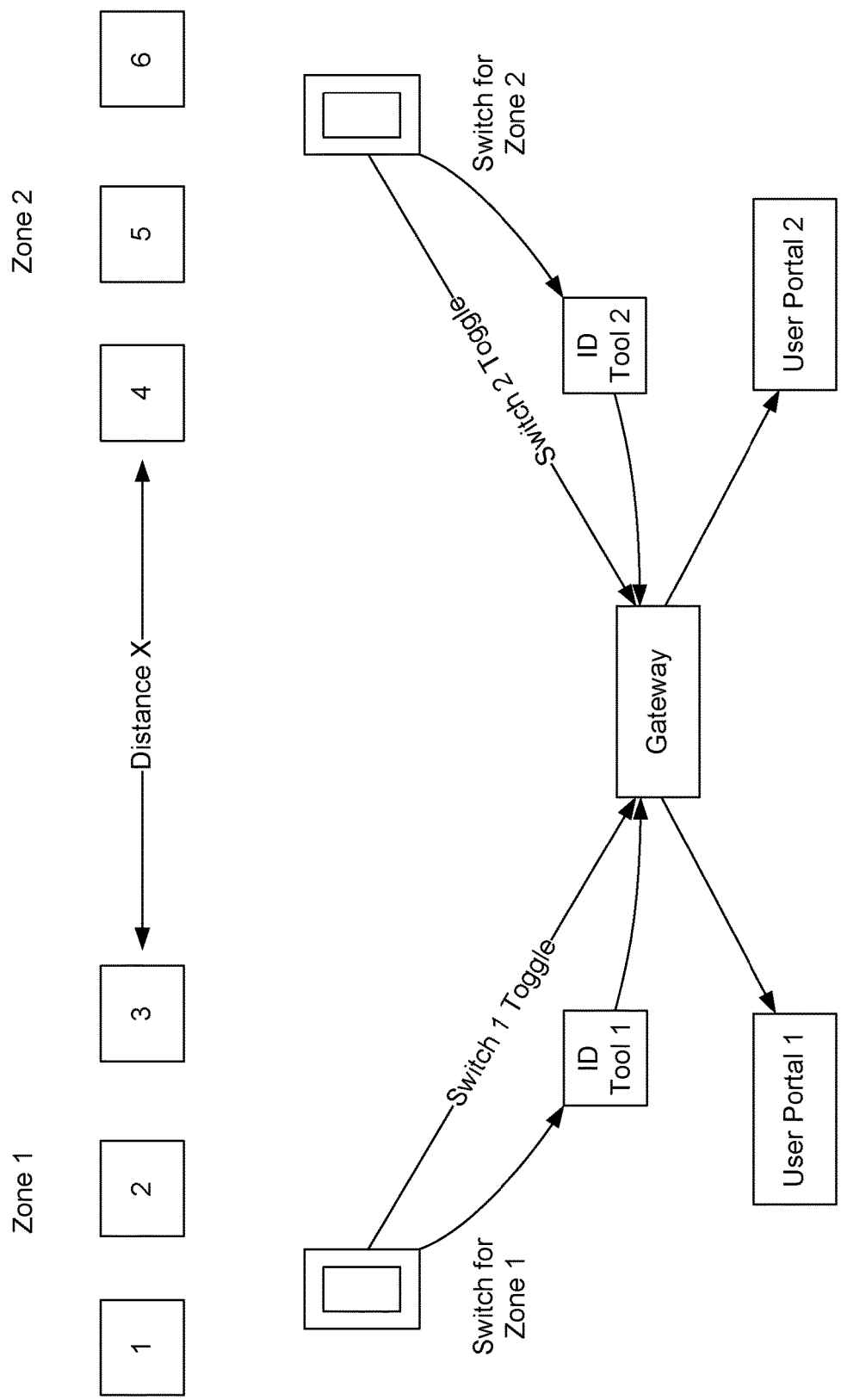
FIG. 10 illustrates another embodiment of a system for commissioning multiple zones of devices and switches.

To help distinguish between signals from two different switches, when both are accidentally toggled at the same time during separate registration processes, the ID tools that each user is using to register the switches, can be used to help differentiate between the two switches as shown in FIG. 10. Here, both ID tools can use signal strength measurements of radio signals transmitted from the switches to determine which switch is closer to each ID tool. The ID tools can then pass radio messages to the gateway indicating which switch is closer to each ID tool, or a signal strength of the switch signals and a location of each ID tool, and in this way the gateway can correlate the radio signals from each switch with a relative location or zone (e.g., zone 1 or zone 2). In other words, each ID tool acts as an intermediary between the switch and the nearest gateway, using signal strength to discriminate between the devices.

Although this example has used switches, sensors (e.g., luminosity, humidity, temperature, etc.) and other devices could be implemented in place of the described switches.

This process can include but is not limited to the following: a user sets the ID tool to listen for a specific type of sensor or switch; a radio signal is sent out from the sensor or switch that needs to be registered; if the ID tool picks up the signal from the type of device it is filtering for with sufficient signal strength, it displays the sensor on a screen of the ID tool; if the switch is made to send out another signal, reception of this is shown real time on the screen as the same switch; at this time, the user is able to forward the info from the switch on to the gateway/server along with the ID of the ID tool. This allows the system to verify which switch is to be registered.

In an embodiment, the gateway, the ID tool, and the installed smart devices can be connected via a local area network (LAN) such as a secure WiFi network (Bluetooth and Zigbee or Z-Wave networks are other examples of local area networks). The server and gateway can be coupled through a wide area network (WAN) such as the Internet, or the local area network. In some embodiments, the server, the ID tool, and the installed smart devices can be on the same local area network and no gateway may be needed.

Figure 11:
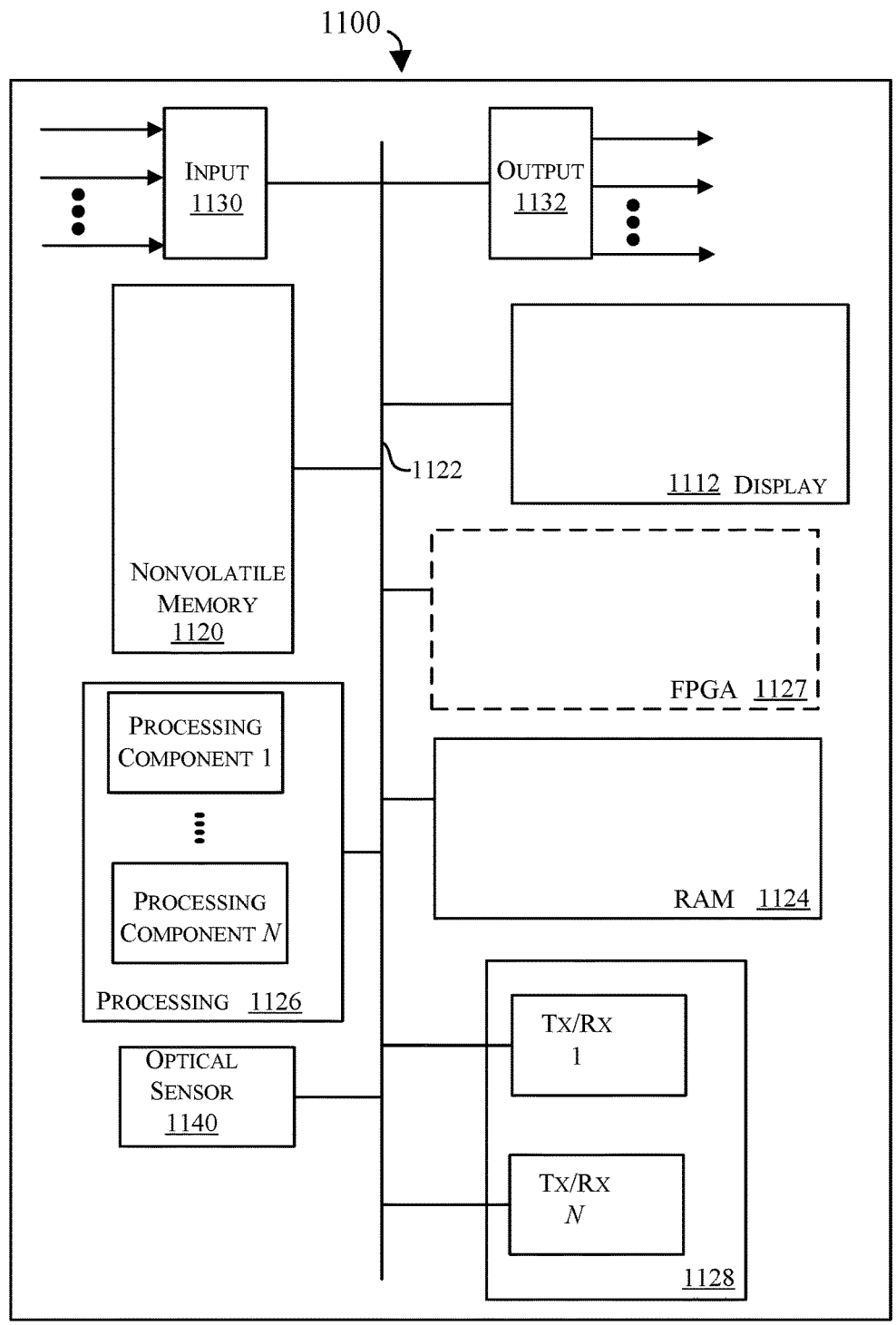
FIG. 11 is a block diagram depicting physical components that may be utilized to realize the ID tool or the commissioning system according to an exemplary embodiment.

The methods described in connection with the embodiments disclosed herein may be embodied directly in hardware, in processor-executable code encoded in a non-transitory tangible processor readable storage medium, or in a combination of the two. Referring to FIG. 11 for example, shown is a block diagram depicting physical components that may be utilized to realize the ID tool 206 or the commissioning system 212 according to an exemplary embodiment. As shown, in this embodiment a display portion 1112 and nonvolatile memory 1120 are coupled to a bus 1122 that is also coupled to random access memory ("RAM") 1124, a processing portion (which includes N processing components) 1126, an optional field programmable gate array (FPGA) 1127, and a transceiver component 1128 that includes N transceivers. Although the components depicted in FIG. 11 represent physical components, FIG. 11 is not intended to be a detailed hardware diagram; thus many of the components depicted in FIG. 11 may be realized by common constructs or distributed among additional physical components. Moreover, it is contemplated that other existing and yet-to-be developed physical components and architectures may be utilized to implement the functional components described with reference to FIG. 11.

This display portion 1112 generally operates to provide a user interface for a user, and in several implementations, the display is realized by a touchscreen display. In general, the nonvolatile memory 1120 is non-transitory memory that functions to store (e.g., persistently store) data and processor-executable code (including executable code that is associated with effectuating the methods described herein). In some embodiments for example, the nonvolatile memory 1120 includes bootloader code, operating system code, file system code, and non-transitory processor-executable code to facilitate the execution of a method described with reference to FIG. 1 described further herein.

In many implementations, the nonvolatile memory 1120 is realized by flash memory (e.g., NAND or ONENAND memory), but it is contemplated that other memory types may be utilized as well. Although it may be possible to execute the code from the nonvolatile memory 1120, the executable code in the nonvolatile memory is typically loaded into RAM 1124 and executed by one or more of the N processing components in the processing portion 1126.

The N processing components in connection with RAM 1124 generally operate to execute the instructions stored in nonvolatile memory 1120 to enable wireless non-line-of-sight commissioning of installed smart devices (e.g., lights, motion detectors, and light switches). For example, non-transitory, processor-executable code to effectuate the methods described with reference to FIG. 1 may be persistently stored in nonvolatile memory 1120 and executed by the N processing components in connection with RAM 1124. As one of ordinarily skill in the art will appreciate, the processing portion 1126 may include a video processor, digital signal processor (DSP), micro-controller, graphics processing unit (GPU), or other hardware processing components or combinations of hardware and software processing components (e.g., an FPGA or an FPGA including digital logic processing portions).

In addition, or in the alternative, the processing portion 1126 may be configured to effectuate one or more aspects of the methodologies described herein (e.g., the method described with reference to FIG. 1). For example, non-transitory processor-readable instructions may be stored in the nonvolatile memory 1120 or in RAM 1124 and when executed on the processing portion 1126, cause the processing portion 1126 to perform a method of wireless non-line-of-sight commissioning of installed smart devices. Alternatively, non-transitory FPGA-configuration-instructions may be persistently stored in nonvolatile memory 1120 and accessed by the processing portion 1126 (e.g., during boot up) to configure the hardware-configurable portions of the processing portion 1126 to effectuate the functions of the ID tool 206 and/or the commissioning system 212.

The input component 1130 operates to receive signals (e.g., the response to the second radio message at the ID tool 206 and/or the fourth radio message at the commissioning system 212) that are indicative of a state and identification of the first selected device. The output component generally operates to provide one or more analog or digital signals to effectuate an operational aspect of the ID tool 206. For example, the output portion 1132 may provide the second and third radio messages addressed to the first selected device.

The depicted transceiver component 1128 includes N transceiver chains, which may be used for communicating with external devices via wireless or wireline networks. Each of the N transceiver chains may represent a transceiver associated with a particular communication scheme (e.g., WiFi, Ethernet, Profibus, etc.). For instance, the transceiver component 1128 may be used by the ID tool 206 to send and receive radio messages from the first selected device.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

As used herein, the recitation of "at least one of A, B and C" is intended to mean "either A, B, C or any combination of A, B and C." The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method comprising:
broadcasting, via a plurality of unregistered installed smart devices, a first radio message unique to each of the plurality of unregistered installed smart devices automatically upon installation without needing an external command to transmit the first radio message, wherein registered installed smart devices do not broadcast the first radio message;
collecting, via an identification tool, those of the first radio messages reaching the identification tool with at least a threshold radio signal strength;
sorting, via the identification tool, the first radio messages by signal strength, the signal strength being characterized by linearity in drop off in the signal strength relative to distance of the unregistered installed smart devices from the identification tool;
selecting, via the identification tool, one of the first radio messages to respond to, this being a selected first radio message;

sending, via the identification tool, a second radio message with an address generated based on a unique identifier of the selected first radio message, the address being uniquely associated with a one of the unregistered installed smart devices that broadcasted the selected first radio message, the one of the unregistered installed smart devices being a first selected device;

receiving a response to the second radio message at the identification tool from the first selected device;

sending a third radio message with the address, via the identification tool, in response to the response, the third radio message including an instruction for the first selected device to enter a registration request mode, wherein in the registration request mode, the first selected device sends a fourth radio message to a commissioning system;

receiving the fourth radio message from the first selected device at the commissioning system, the fourth radio message including a location and identification of the first selected device, and wherein the location and identification of the first selected device is different from the address of the first selected device; and storing in memory, via the commissioning system, the location and identification of the first selected device, wherein the first selected device terminates broadcasting its first radio message in response to the receiving of the response to the second radio message at the identification tool, wherein upon terminating said broadcasting the first selected device joins said registered installed smart devices that do not broadcast the first radio message.

2. The method of claim 1, further comprising:
once the commissioning system has stored the location and identification of the first selected device, the identification tool selects a second of the radio messages to respond to, and removes the first radio message from a list of radio messages to be addressed.

3. The method of claim 1, further comprising:
once the first selected device terminates broadcasting its first radio message, the identification tool selects the second of the radio messages to respond to as it no longer is receiving the first radio message from the first selected device.

4. The method of claim 3, wherein the identification tool begins registering a second of the unregistered installed smart devices before registration of the first selected device is completed.

5. The method of claim 1, wherein the response is a blinking of an LED.

6. The method of claim 5, wherein the receiving of the response is performed by an optical sensor of the identification tool.

7. The method of claim 1, further comprising:
sending a fifth radio message to the first selected device confirming that registration is complete.

8. An identification tool comprising:
a processing portion with one or more processing components therein;
a memory coupled to the processing portion; and
a registration module stored on the memory and executable on the processing portion to:
collect first radio messages, from a plurality of unregistered installed smart devices, reaching the identification tool with at least a threshold radio signal strength, each of the first radio messages being unique to a one of the plurality of unregistered installed smart devices, the first radio messages automatically being transmitted by unregistered installed smart upon installation without needing an external command to issue the first radio messages, wherein registered installed smart devices do not broadcast the first radio message;

sort the first radio messages by signal strength, the signal strength being characterized by linearity in drop off in the signal strength relative to distance of the unregistered installed smart devices from the identification tool;

select one of the first radio messages to respond to, this being a selected first radio message;

send a second radio message with an address generated based on a unique identifier of the selected first radio message, the address being uniquely associated with a one of the unregistered installed smart devices that broadcasted the selected first radio message, the one of the unregistered installed smart devices being a first selected device;

receive a response to the second radio message from the first selected device, wherein the first selected device terminates broadcasting its first radio message upon said receiving the response to the second radio message, wherein upon terminating said broadcasting the first selected device joins registered installed smart devices that do not broadcast the first radio message; and send a third radio message with the address in response to the response, the third radio message addressed to the first selected device and including an instruction for the first selected device to enter a registration request mode, wherein in the registration request mode, the first selected device sends a fourth radio message to a commissioning system, the fourth radio message including an identification and a location of the first selected device to register the first selected device, and the location and identification of the first selected device is different from the address of the first selected device.

9. The identification tool of claim 8, wherein the registration module is further executable to, once the first selected device said terminates broadcasting its first radio message, select the second of the radio messages to respond to as it no longer is receiving the first radio message from the first selected device.

10. The identification tool of claim 9, wherein the registration module is further executable to begin registering a second of the installed smart devices before registration of the first selected device is completed.

11. The identification tool of claim 8, wherein the response is a blinking of an LED.

12. The identification tool of claim 11, wherein the identification tool further comprises an optical sensor configured to receive the response from the first selected device.

13. The identification tool of claim 8, the registration module is further executable to send a fifth radio message to the first selected device confirming that registration is complete.

14. The identification tool of claim 13, wherein the commissioning system is hosted on the identification tool.

15. The identification tool of claim 8, wherein the commissioning system is remote from and only in wireless communication with the identification tool.

16. The identification tool of claim 8, wherein the fourth radio message passes through a gateway in route to a server hosting the commissioning system.

17. The identification tool of claim 8, wherein at least some of the unregistered installed smart devices are LED light fixtures.

18. A non-transitory, tangible computer readable storage medium, encoded with processor readable instructions to perform a method for wirelessly, and without line-of-sight, commissioning unregistered installed smart devices, the method comprising:
- collecting first radio messages, from a plurality of unregistered installed smart devices, reaching an identification tool with at least a threshold radio signal strength, each of the first radio messages being unique to a one of the plurality of unregistered installed smart devices, the first radio messages automatically being transmitted by unregistered installed smart upon installation without needing an external command to issue the first radio messages, wherein registered installed smart devices do not broadcast the first radio message;
- sorting the first radio messages by signal strength, the signal strength being characterized by linearity in drop off in the signal strength relative to distance of the registered installed smart devices from the identification tool;
- selecting one of the first radio messages to respond to, this being a selected first radio message;
- sending a second radio message with an address generated based on a unique identifier of the selected first radio message, the address being uniquely associated with a one of the unregistered installed smart devices that broadcasted the selected first radio message, the one of the u n registered installed smart devices being a first selected device;
- receiving a response to the second radio message from the first selected device, wherein the first selected device terminates broadcasting its first radio message upon said receiving the response to the second radio message, wherein upon terminating said broadcasting the first selected device joins said registered installed smart devices that do not broadcast the first radio message; and
- sending a third radio message with the address in response to the response, the third radio message addressed to the first selected device and including an instruction for the first selected device to enter a registration request mode, wherein in the registration request mode, the first selected device sends a fourth radio message to a commissioning system, the fourth radio message including an identification and a location of the first selected device to register the first selected device, and the location and identification of the first selected device is different from the address of the first selected device.

\* \* \* \* \*